United States Patent
Vasquez et al.

(10) Patent No.: US 8,843,999 B1
(45) Date of Patent: *Sep. 23, 2014

(54) VOIP IDENTIFICATION SYSTEMS AND METHODS

(75) Inventors: Juan Vasquez, San Jose, CA (US); Michael Runge, San Mateo, CA (US)

(73) Assignee: Google Inc., Mountain View, CA (US)

(*) Notice: Subject to any disclaimer, the term of this patent is extended or adjusted under 35 U.S.C. 154(b) by 62 days.

This patent is subject to a terminal disclaimer.

(21) Appl. No.: 13/450,360

(22) Filed: Apr. 18, 2012

(51) Int. Cl.
*H04L 29/06* (2006.01)

(52) U.S. Cl.
USPC .................................................. 726/3; 726/28

(58) Field of Classification Search
None
See application file for complete search history.

(56) References Cited

U.S. PATENT DOCUMENTS

| | | | |
|---|---|---|---|
| 6,958,992 | B2 | 10/2005 | Lee et al. |
| 7,315,943 | B2 | 1/2008 | Shibata |
| 7,735,114 | B2 | 6/2010 | Kwan et al. |
| 2003/0167298 | A1 | 9/2003 | Bazinet et al. |
| 2006/0248600 | A1 | 11/2006 | O'Neill |
| 2008/0075064 | A1 | 3/2008 | Krantz et al. |
| 2008/0084870 | A1* | 4/2008 | Taylor et al. .............. 370/352 |
| 2009/0168756 | A1 | 7/2009 | Kurapati et al. |
| 2009/0238172 | A1 | 9/2009 | Tanizawa et al. |
| 2010/0023603 | A1 | 1/2010 | Archer et al. |
| 2010/0284368 | A1 | 11/2010 | Haddad et al. |
| 2011/0022841 | A1 | 1/2011 | Petillo |
| 2012/0042082 | A1* | 2/2012 | Liao et al. .................... 709/227 |
| 2012/0069838 | A1 | 3/2012 | Sarkar et al. |

OTHER PUBLICATIONS

Battistello, et al. "Analysis of Token and Ticket Based Mechanisms for Current VoIP Security Issues and Enhancement Proposal," Communications and Multimedia Security Lecture Notes in Computer Science, vol. 6109, pp. 154.
Goode, et al. "Voice over Internet protocol (VoIP)," Proceedings of the IEEE, AT&T Labs., Weston, CT, vol. 90, Issue 9, pp. 1495.
Cisco Systems, Inc. "Deploying 802.1x-Based Port Authentication on the Cisco Virtual Office Solution," Guide; Cisco Systems, Inc.; pp. 1-12; 2009.
Watkins, George. "Two-Factor Authentication With Google Authenticator and LDAP," DevCentral.com, Dec. 20, 2011 (available at: https://devcentral.f5.com/articles/two-factor-authentication-with-google-authenticator-and-ldap).

* cited by examiner

*Primary Examiner* — Pramila Parthasarathy
(74) *Attorney, Agent, or Firm* — Leydig, Voit & Mayer, Ltd.

(57) ABSTRACT

A method for identifying a user of a Voice over Internet Protocol (VoIP) phone in a network, the VoIP phone connected to a computing device via a communication link, includes receiving a request for an authorization token from a computing system on the network; sending a request to the computing device to generate an authorization token in response to the request, the authorization token generated by the computing device based on authentication data associated with the user; receiving the authorization token from the computing device; sending a message containing the authorization token to the computing system for validating an identity of the user; and sending, in response to validating the identity, a subsequent message containing the authorization token to the computing system.

18 Claims, 3 Drawing Sheets

VOIP IDENTIFICATION SYSTEMS AND METHODS

TECHNICAL FIELD

The disclosure relates generally to the field of Voice over Internet Protocol (VoIP) systems and methods, and, in particular, implementations relate to VoIP identification systems and methods.

BACKGROUND

Voice over Internet Protocol (VoIP) is a technology used for the routing of voice conversations over a data network using Internet Protocol (IP). The data network may be the Internet or any other IP-based network, such as an enterprise intranet. VoIP networks are typically viewed as a lower cost alternative to traditional public switched telephone networks (PSTN).

A typical VoIP network is comprised of one or more application servers and a plurality of endpoints. The endpoints are network elements used to originate or terminate a call over the VoIP network, such as a VoIP phone, a PDA, a computer with VoIP functionality, etc. The application server provides call processing within the VoIP network to allow the endpoints to place and receive calls over the VoIP network. The protocol typically used between the endpoints and the application server for call setup, maintenance, and call teardown is Session Initiation Protocol (SIP), although other protocols may be used. The protocol typically used for data transfer over the VoIP network (i.e., bearer traffic for a VoIP call) is Real-time Transport Protocol (RTP), although other protocols may be used.

Unlike traditional analog phones, endpoints of a VoIP network need to be configured to connect to the VoIP network. The endpoints have local configuration parameters that need to be set by the network operator, by the user of the endpoint, or another party or system. Examples of local configuration parameters that need to be set include an SIP application server IP address, SIP timers, audio/video compression/decompression (CODEC) registrar, proxy, domain, user, etc. The endpoints typically provide a local configuration interface through which the user of the endpoint or a network operator can set or adjust the configuration parameters of the endpoint. The local configuration interface may be a menu-based or window-based interface that allows a user to enter values for the configuration parameters.

Systems that provide configuration files exist, but most systems require a device to be trusted by a network. In addition, trust is difficult to maintain as trust generally relies on a recipient having to trust information provided by a client to identify itself.

BRIEF SUMMARY

A method for identifying a user of a Voice over Internet Protocol (VoIP) phone in a network, the VoIP phone connected to a computing device via a communication link, includes, but is not limited to, any one or combination of: (i) receiving a request for an authorization token from a computing system configured to handle VoIP communications on the network; (ii) sending a request to the computing device to generate an authorization token in response to the request received from the computing system, wherein the authorization token is generated by the computing device based on authentication data associated with the user of the VoIP phone; (iii) receiving the authorization token from the computing device; (iv) sending a message containing the authorization token received from the computing device to the computing system for validating an identity of the user of the VoIP phone; and (v) sending, in response to validating the identity of the user of the VoIP phone, a subsequent message containing the authorization token received from the computing device to the computing system.

In various implementations, the authorization token comprises a one-time password (OTP) token.

In various implementations, the request message is a Session Initiation Protocol (SIP) message. In some implementations, the authorization token is embedded in a header portion of the SIP message. In some implementations, the authorization token is included in the SIP message for parsing out by the computing system of the network.

In various implementations, the method further includes receiving a request for an updated authorization token from the computing system of the network; sending a request to the computing device to generate an updated authorization token in response to the update request received from the computing system; receiving the updated authorization token from the computing device; and sending a request message to the computing system, the request message containing the updated authorization token received from the computing device. In some implementations, the request for the updated authorization token is in response to an occurrence of a predetermined event. In further implementations, the occurrence of the predetermined event is an expiration of the authorization token. In further implementations, the occurrence of the predetermined event is a passage of a predetermined amount of time. In further implementations, the occurrence of the predetermined event is an attempt to access a voicemail message of a voicemail server on the network. In yet further implementations, the request for the updated authorization token corresponds to a request received by the computing system from the mail server. In further implementations, the predetermined event occurs if the communication link between the VoIP phone and the computing device is broken.

In various implementations, the user authentication data includes at least one of Lightweight Directory Access Patrol (LDAP), Active Directory (AD), and Kerberos.

In various implementations, the subsequent request message containing the authorization token is associated with the user of the VoIP phone.

In various implementations, the communication link is via a tethered connection.

In various implementations, the communication link is a wireless connection.

In various implementations, the authorization token is generated by the computing device based on token data on an authorization server. The identity of the user of the VoIP phone is identified based on the authorization token and the token data on the authorization server.

In various implementations, the method further includes receiving an acknowledgement from the computing system that the identity of the user of the VoIP phone has been determined. The subsequent message is sent in response to the acknowledgement.

A system for identifying a user of a Voice over Internet Protocol (VoIP) phone in a network includes a processor. The VoIP phone is connected to a computing device via a communication link. The processor for receiving a request for an authorization token from a computing system configured to handle VoIP communications on the network. The processor is for transmitting a request to the computing device to generate an authorization token in response to the request received from the computing system. The authorization token is generated by the computing device based on authentication data associated with the user of the VoIP phone. The processor is for receiving the authorization token from the computing device. The processor is for sending a message containing the authorization token received from the computing device to the computing system for validating an identity of the user of the VoIP phone. The processor is for sending, in response to validating the identity of the user of the VoIP phone, a subsequent message containing the authorization token received from the computing device to the computing system.

A computer program product for identifying a user of a Voice over Internet Protocol (VoIP) phone in a network, the VoIP phone connected to a computing device via a communication link includes a computer-readable storage medium comprising code for, but is not limited to, any one or combination of: (i) receiving a request for an authorization token from a computing system configured to handle VoIP communications on the network; (ii) sending a request to the computing device to generate an authorization token in response to the request received from the computing system, wherein the authorization token is generated by the computing device based on authentication data associated with the user of the VoIP phone; (iii) receiving the authorization token from the computing device; (iv) sending a message containing the authorization token received from the computing device to the computing system for validating an identity of the user of the VoIP phone; and (v) sending, in response to validating the identity of the user of the VoIP phone, a subsequent message containing the authorization token received from the computing device to the computing system.

DETAILED DESCRIPTION

Various implementations relate to a system and method for issuing temporary credentials to a Voice over Internet Protocol (VoIP) phone. The temporary credentials may be time-based one-time passwords (OTP). Accordingly, the identity of a caller on the VoIP phone, as opposed to the VoIP phone itself, may be validated and maintained for the duration of the OTP. In particular implementations, a computing device having a trusted connection with an SIP (Session Initiation Protocol)-based VoIP phone provides an OTP token encoded into a user-defined header. A softswitch may parse out the OTP token and provide the OTP token to the authorization server for identification (authentication) of the user of the VoIP phone.

Figure 1:
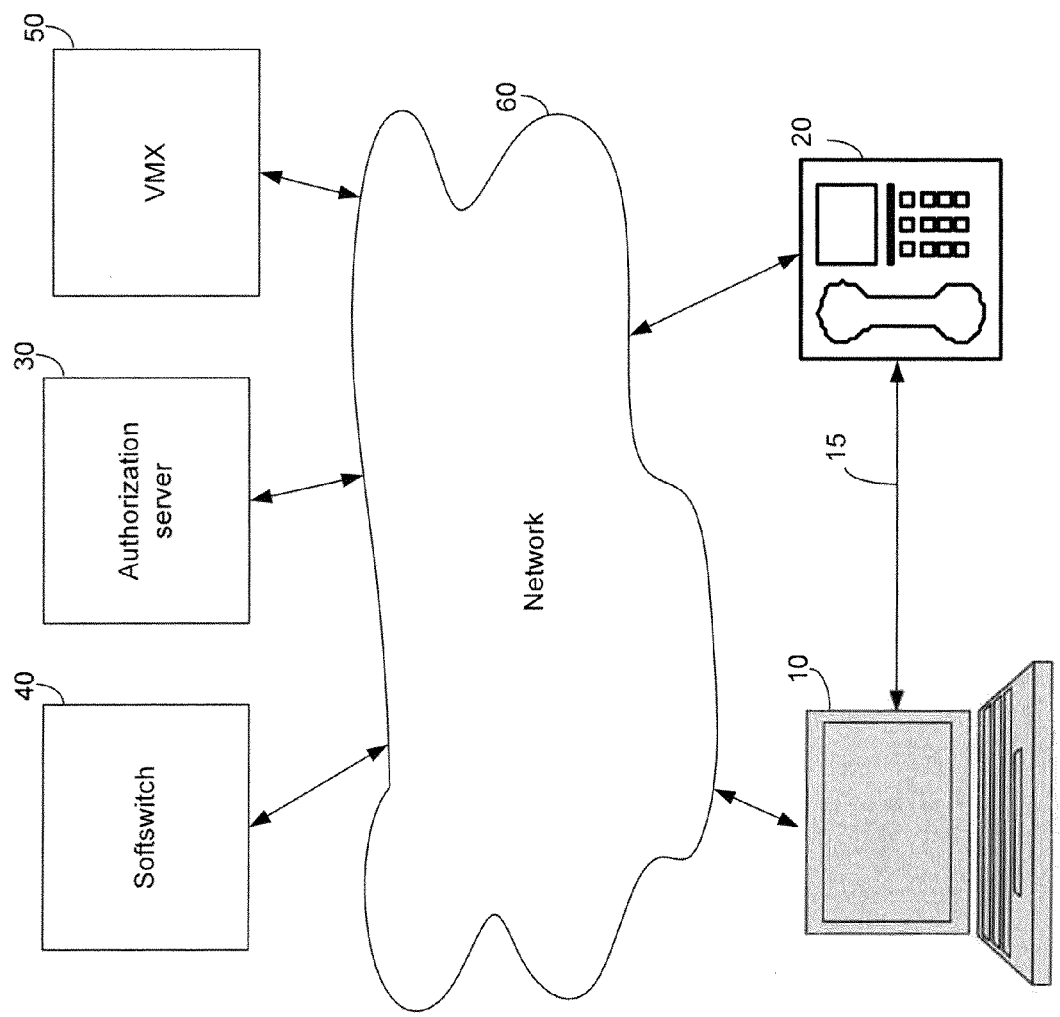
FIG. 1 is a network environment according to various implementations of the disclosure.

FIG. 1 is a block diagram of a network environment in which systems (e.g., system 100) and methods described herein may be implemented. As illustrated, the system 100 may include (but is not limited to) a VoIP phone 20 (endpoint), a computing device 10, an authorization server 30, and a softswitch 40 interconnected with a network 60. The configuration illustrated in FIG. 1 is provided for illustrative purposes. It should be understood that the system 100 may include more or fewer devices than illustrated in FIG. 1.

In some implementations, the VoIP phone 20 may be a standalone (hard phone) device (e.g., a VoIP telephone configured to function and appear like a conventional telephone). In further implementations, the VoIP phone 20 may include a software client that may run, for example, on the user computer 10, or the like. In other implementations, the system 100 may use any suitable user device in place of (or in addition to) the VoIP phone 20. In such implementations, the user device may include any type of communication or computation device that is capable of transmitting and receiving voice signals and/or data to/from a network. For example, the user device may include any standard telephone, cordless telephone, cellular telephone, or other type of conventional telephone that interfaces with a public switched telephone network (PSTN) and/or wireless network to place and receive telephone calls. The user device may also include any client, such as a computer device, a web-based appliance, etc., that is configured to provide telephone functions using, for example, voice over Internet protocol (VoIP).

The computing device 10 may be any device associated with a user, such as a personal computer, a mobile device, a tablet computer, a personal digital assistant (PDA), and/or the like. The computing device 10 is configured to establish a trusted link between the computing device 10 and the VoIP phone 20. In various implementations, the trusted link between the computing device 10 and the VoIP phone 20 allows a user to provide information (e.g., username and password) to the computing device 10 to authenticate (e.g., identify) the user using the VoIP phone 20 linked with the computing device 10.

The authorization server 30 may be a server using a RADIUS (Remote Authentication Dial In User Service) protocol, which provides centralized Authentication, Authorization, and Accounting (AAA) management for devices to connect and use a network service. The RADIUS server 60 authenticates users or devices before granting them access to a network, authorizes those users or devices for certain network services, and authorizes accounts for usage of those services.

The softswitch 40 may be used to route traffic among the various components of the system 100. In particular, the VoIP phone 20 may be registered with the softswitch 40 so that the softswitch 40 can allow the VoIP phone 20 access to the network 60. The softswitch 40 is a server that maintains a state of the VoIP phone 20 and provides rules and features to the VoIP phone 20 registered with the softswitch 40. For instance, in some implementations, the softswitch 40 controls configuration (e.g., buttons, speed dials, etc.) for the VoIP phone 20. When a call comes in via PSTN or VoIP, the call is received at the softswitch 40. The softswitch 40 will send the call to a specified VoIP, for instance, based on rules (e.g., dialplan), registrations (endpoints), and/or the like. The softswitch 40 may be a software equivalent of a physical special purpose phone PBX (private branch exchange). In other implementations, the softswitch 40 may be or be associated with a PBX. In some implementations, other components of the system 100, such as (but not limited to) a proxy, a Session Border Controller (SBC), and/or the like may be provided to pass information between the VoIP phone 20 and the softswitch 40. In various embodiments, the softswitch 40 may be any suitable computing system configured to handle VoIP communications.

The network 60 may include one or more wired and/or wireless networks that are capable of receiving and transmitting data and voice signals. For example, the network 60 may include one or more public switched telephone networks (PSTNs) or other type of switched network. The network 60 may also include one or more wireless networks and may include a number of transmission towers for receiving wireless signals and forwarding the wireless signals toward the intended destination. The network 60 may further include one or more packet switched networks, such as an Internet protocol (IP) based network, a local area network (LAN), a wide area network (WAN), an intranet, the Internet, or another type of network that is capable of transmitting telecommunications traffic (e.g., VoIP traffic). In some implementations, the network 60 includes one or more SIP (Session Initial Protocol)-based networks. In other implementations, the network 60 includes, one or more H.323/H.225-based networks or any other type of packet switched network that is capable of transmitting traffic from a source device to a destination device.

The computing device 10 may include a software client or is otherwise configured for generating authorization tokens for the VoIP phone 20. In particular implementations, the computing device 10 is configured to generate one-time password (OTP) tokens for the VoIP phone 20.

A one-time password (OTP) is a password that is valid for only one login session or transaction. In particular, an OTP is not vulnerable to replay attacks. This means that, if a potential intruder manages to record an OTP that was already used to log into a service or to conduct a transaction, he or she will not be able to abuse the recorded OTP because the recorded OTP will be no longer valid.

OTP generation algorithms typically make use of randomness. In some implementations, OTP generation is based on time-synchronization between the authentication server (e.g., 30) and the client (e.g., the VoIP phone 20, the computing device 10, etc.) providing the password. A time-synchronized (time-based) OTP is usually related to a token, which is a piece of hardware or software run by hardware (e.g., the computing device 10). The token includes an accurate clock that has been synchronized with the clock on the authentication server. On these OTP systems, time is an important part of the password algorithm since the generation of new passwords is based on the current time.

In other implementations, the OTP generation is based on using a mathematical algorithm to generate a new password based on a previous password. As such, OTPs are effectively a chain and must be used in a predefined order. In yet other implementations, the OTP generation is based on using a mathematical algorithm where the new password is based on a challenge (e.g., a random number chosen by the authentication server or transaction details) and/or a counter. However, in various implementations, any suitable manner may be used for OTP generation, such as (but not limited to) using special electronic tokens that the user carries and that generate OTPs and, for example, displays the OTPs using a small display, using software that runs on the user's mobile phone, implementing a system for generating OTPs on the server-side and sending them to the user using an out-of-band channel such as SMS messaging, and/or the like.

In various implementations, standard (static) passwords or tokens may be used as the authorization tokens. In other implementations, authorization tokens may be requested, generated, or otherwise provided via audio prompts on an interactive voice response (IVR) system.

Figure 2:
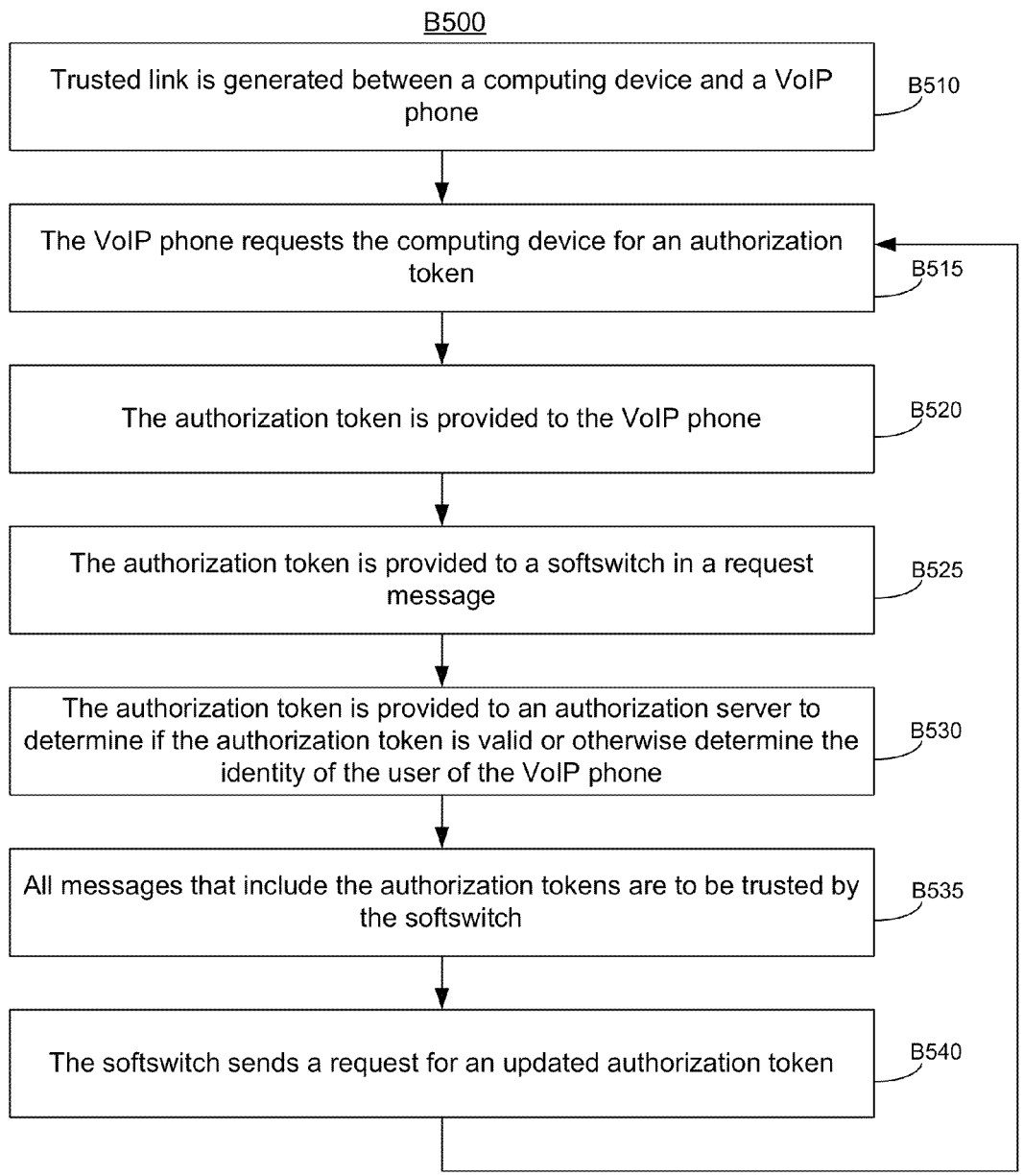
FIG. 2 illustrates a flow chart of an identification method according to various implementations of the disclosure.

With reference to FIGS. 1 and 2, a method of VoIP identification B500 according to various implementations of the disclosure is provided. At block B510, a trusted link 15 is generated or otherwise established between the computing device 10 and the VoIP phone 20. The trusted link 15 may be provided via a wired (tethered) connection (e.g., USB, serial, IEEE 1394, thunderbolt, etc.). In other implementations, the trusted link 15 may be provided via a wireless connection (e.g., Bluetooth, infrared, an 802.11-based protocol, etc.). In various implementations, the trusted link 15 suggests that because the user has control (e.g., by providing user credentials) of the computing device 10 and the computing device 10 is connected (tethered or wirelessly) or is otherwise sufficiently close to suggest that the user has control of both devices, the user is authorized to use the VoIP phone 20. Various methods for establishing a trusted link are described in, but are not limited to, U.S. application Ser. No. 13/350,670, filed Jan. 13, 2012, which is herein incorporated by reference in its entirety. Identification (authentication) of the user of the VoIP phone 20, which has the trust link 15 with the computing device 10, may be established by inputting user authentication data to the computing device 10. The user may provide the computing device 10 with the authentication data in any suitable manner including (but not limited to) via Lightweight Directory Access Protocol (AP), Active Directory (AD), Kerberos, and/or the like.

At block B515, the VoIP phone 20 requests the computing device 10 for an authorization token, such as (but not limited to) a time-based OTP token. At block B520, the computing device 10 generates the authorization token in response to the request and provides the VoIP phone 20 with the authorization token. As discussed in the disclosure, in some implementations, the authorization token is generated based on token data of the authorization server 30. For instance, the authorization token includes an accurate clock that has been synchronized with the clock on the authorization server 30. In further implementations, the authorization token is generated based on the user authentication data that was input to the computing device 10.

At block B525, the authorization token is provided to the softswitch 40. In some implementations, the authorization token is provided by the VoIP phone 20 to the softswitch 40, for instance when a session (e.g., call) is initiated. In various implementations, the authorization token is embedded within a request message to the softswitch 40. The authorization token, for instance, may be embedded in a user-defined header of the request message or any other portion of the request message that does not break protocol for the request message. In particular implementations, the request message is an SIP message. In such implementations, for instance, the authorization token may be embedded in a header of the SIP message or any other portion of the SIP message that does not break SIP protocol. In various implementations, the softswitch 40 is configured to parse out the authorization token from the request message.

At block B530, the softswitch 40 sends the authorization token to the authorization server 30 to determine whether the authorization token is valid and/or otherwise determine the identity of the user of the VoIP phone 20, which sent the message containing the authorization token, for instance, by comparing the authorization token with data provided on (or otherwise accessible by) the authorization server 30. If the authorization server 30 identifies the identity of the user of the VoIP phone 20, which sent the message containing the authorization token, the session is deemed trusted. The authorization server 30 may send a notification to the softswitch or the like that the identity of user has been identified and that the session with the user is to be trusted. If the authorization server 30 is unable to determine the identity of the user based on the authorization token, a different operation, such as denying registration, limiting operation of the VoIP phone 20 (e.g., use only for emergency calls), shutting down the VoIP phone 20, etc., may be performed.

At block B535, in response to trusting the session, the softswitch 40 will trust all messages that include the authorization token. In some implementations, the softswitch 40 will send an acknowledgement to the VoIP phone 20 that the user was identified (and thus messages with the authorization token will be trusted). In implementations in which the authorization token is a time-based OTP token, the softswitch 40 will trust all messages that include the authorization token for a predetermined amount of time. The predetermined amount of time, for instance, may be established when the OTP token was generated (e.g., by the computing device 10). In other implementations, the messages may be trusted until the occurrence of some other predetermined event, such as the invalidation of the authorized token, or the like.

In some implementations, the OTP token or other authorization token may be invalidated (e.g., erased, removed, modified, etc.) or other measures (e.g., changing password on the softswitch 40) may occur based on various events (e.g., passage of a predetermined amount of time, number of uses, initiating a conference bridge session, accessing a voicemail message, etc.). In particular implementations, the authorization token is invalidated (or other measures may occur) upon determining that the trusted link 15 between the computing device 10 and the VoIP phone 20 has been broken (e.g., disconnected).

After the predetermined amount of time (or upon the occurrence of some other predetermined event), at block B540, the softswitch 40 may send a request, for example to the VoIP phone 20, for an updated authorization token. In response to the request, the VoIP phone 20 may request the computing device 10 for the updated authorization token, for instance, in a manner such as in block B515. Then, the computing device 10 may generate the updated authorization token in response to the request and provides the VoIP phone 20 with the authorization token, for instance, in a manner such as in block B520. The updated authorization token may be provided to the softswitch 40, for instance, in a manner such as in block B525. In various implementations, the updated authorization token is embedded within a request message to the softswitch 40. For instance, if the request message is an SIP message, the updated authorization token may be embedded in an OPTIONS, INVITE, ACK, or other request message. As with the authorization token, the updated authorization token, for instance, may be embedded in a user-defined header of the message or any other portion of the message that does break the message protocol. The softswitch 40 may send the updated authorization token to the authorization server 30 to determine whether the authorization token is valid, for instance, in a manner such as in block B530. If the authorization server 30 validates the authorization token, the session is deemed trusted. In response to trusting the session, the softswitch 40 will trust all messages that include the updated authorization token, for instance, in a manner such as in block B535.

Figure 3:
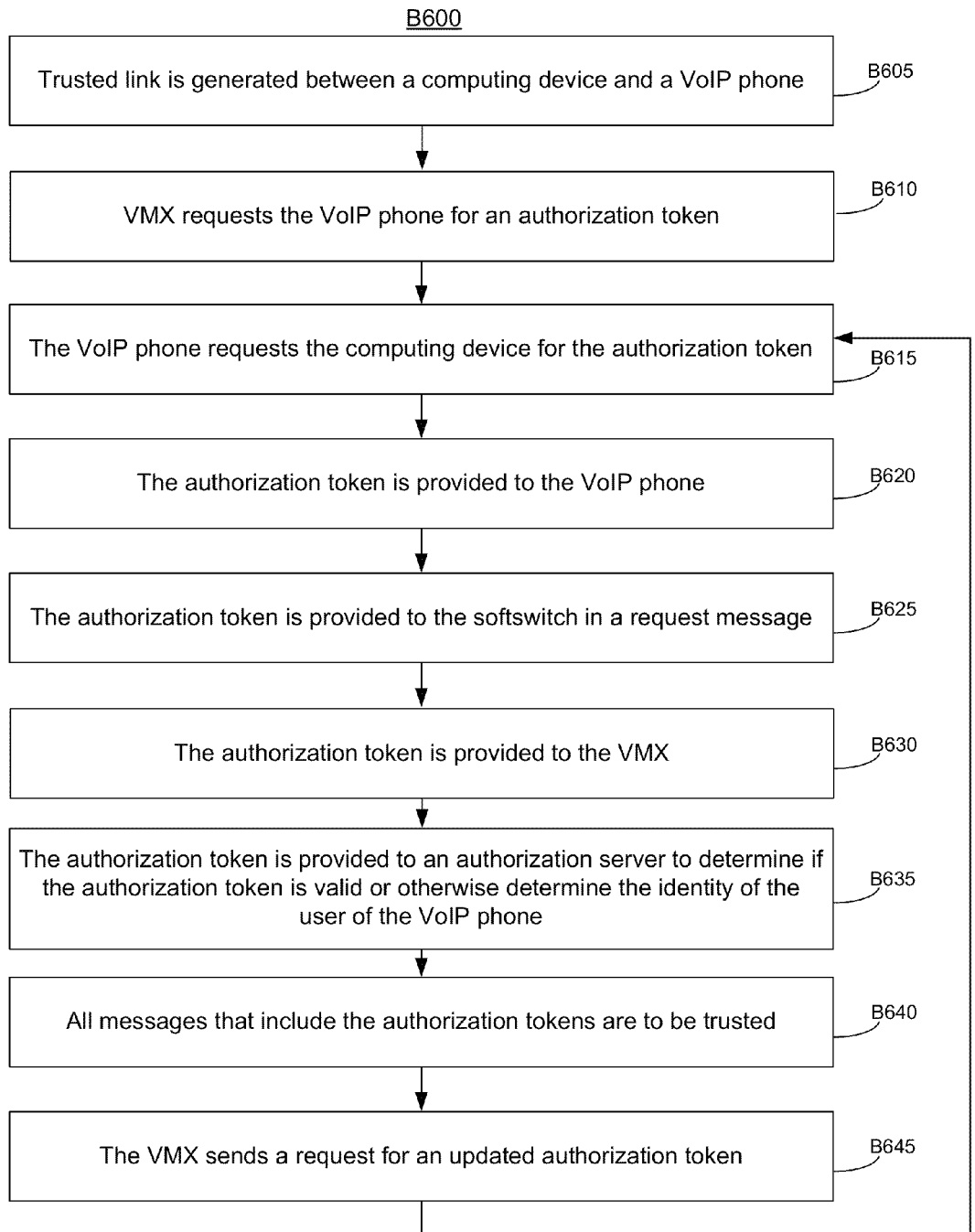
FIG. 3 illustrates a flow chart of an identification method according to various implementations of the disclosure.

In various implementations, the system 100 includes a voicemail server (VMX) 50 for managing (e.g., controlling access to) voicemail messages or the like. With reference to FIGS. 1-3, a method of VoIP identification B600 according to various implementations of the disclosure is provided. At block B605 (which may correspond to B510), a trusted link 15 is generated or otherwise established between the computing device 10 and the VoIP phone 20.

At block B610, in response to a call (or session) from the VoIP phone 20, for instance via the softswitch 40, reaching the VMX 50 (e.g., the VoIP phone 20 is attempting to access a voicemail of the VMX 50), the VMX 50 sends a request for an authorization token (or an updated authorization token), for instance to the VoIP phone 20 via the softswitch 40. In such implementations, for instance, the VMX 50 requests an (updated) authorization token to ensure that the VoIP phone 20 that is attempting to access the voicemail of the VMX 50 is authorized to access the voicemail. Accordingly, in various implementations, accessing a voicemail of the VMX 50 may cause the VMX 50 (or other component of the system 100) to request an authorization token. Other events may also cause the VMX 50 or the like to request an authorization token such as in response to a conference bridge, dialing a sensitive number, and/or the like. In particular implementations, block B610 may occur after block B535 (in response to trusting the session, the softswitch 40 will trust all messages that include the authorization token).

At block B615 (which may correspond to B515), the VoIP phone 20 requests the computing device 10 for an authorization token, such as (but not limited to) a time-based OTP token. At block B620 (which may correspond to B520), the computing device 10 generates the authorization token in response to the request and provides the VoIP phone 20 with the authorization token.

At block B625 (which may correspond to B525), the authorization token is provided to the softswitch 40. In various implementations, the authorization token is embedded within a request message, for instance as described in (but not limited to) the disclosure. The authorization token, for instance, may be embedded in a user-defined header of an SIP message or any other portion of the SIP message that does not break SIP protocol. In various implementations, the softswitch 40 is configured to parse out the authorization token.

At block B630, the softswitch 40 sends the authorization token to the VMX 50. In other implementations, the softswitch 40 sends the message to the VMX 50 for the VMX 50 to parse out the authorization token. At block B635, the VMX 50 sends the authorization token to the authorization server 30 to determine whether the authorization token is valid and/or otherwise determine the identity of the user of the VoIP phone 20, which sent the message containing the authorization token, for instance, by comparing the authorization token with data provided on (or otherwise accessible by) the authorization server 30. One or more of block B630 and block B635 may correspond to B530. If the authorization server 30 identifies the identity of the user of the VoIP phone 20, which sent the message containing the authorization token, the session is deemed trusted. The authorization server 30 may send a notification to the VMX 50 or the like that the identity of user has been identified and that the session with the user is to be trusted. If the authorization server 30 is unable to determine the identity of the user based on the authorization token, a different operation, such as denying registration, limiting operation of the VoIP phone 20 (e.g., use only for emergency calls), shutting down the VoIP phone 20, etc., may be performed. In other implementations, the softswitch 40 uses the authorization token, for instance with the authorization server 30, to determine whether the authorization token is valid and/or otherwise determine the identity of the user of the VoIP phone 20.

At block B640, in response to trusting the session, the VMX 50 (and the softswitch 40) will trust all messages that include the authorization token. In some implementations, the VMX 50 (and/or the softswitch 40) will send an acknowledgement to the VoIP phone 20 that the user was identified (and thus messages with the authorization token will be trusted). As discussed with respect to the method B500, at block B645, the VMX 50 may request, and may accordingly receive, updated authorization tokens after a predetermined amount of time or upon occurrence of a predetermined event.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method for identifying a user of a Voice over Internet Protocol (VoIP) phone in a network, the VoIP phone connected to a computing device via a communication link, the method comprising:
   receiving a request for an authorization token from a computing system configured to handle VoIP communications on the network;
   sending a request to the computing device to generate an authorization token in response to the request received from the computing system, wherein the authorization token is generated by the computing device based on authentication data associated with the user of the VoIP phone;
   receiving the authorization token from the computing device;
   sending a message including the authorization token received from the computing device to the computing system for validating an identity of the user of the VoIP phone, wherein the authorization token is generated by the computing device based on token data on an authorization server;
   receiving an acknowledgement from the computing system that the identity of the user of the VoIP phone has been determined, wherein the identity of the user of the VoIP phone is determined based on the authorization token and the token data on the authorization server; and
   sending, in response to the acknowledgement, a subsequent message containing the authorization token received from the computing device to the computing system.

2. The method of claim 1, wherein the authorization token comprises a one-time password (OTP) token.

3. The method of claim 1, wherein the request message is a Session Initiation Protocol (SIP) message.

4. The method of claim 3, wherein the authorization token is embedded in a header portion of the SIP message.

5. The method of claim 3, wherein the authorization token is included in the SIP message for parsing out by the computing system of the network.

6. The method of claim 1, the method further comprising:
receiving a request for an updated authorization token from the computing system of the network;
sending a request to the computing device to generate an updated authorization token in response to the update request received from the computing system;
receiving the updated authorization token from the computing device; and
sending a request message to the computing system, the request message containing the updated authorization token received from the computing device.

7. The method of claim 6, wherein the request for the updated authorization token is in response to an occurrence of a predetermined event.

8. The method of claim 7, wherein the occurrence of the predetermined event is an expiration of the authorization token.

9. The method of claim 7, wherein the occurrence of the predetermined event is a passage of a predetermined amount of time.

10. The method of claim 7, wherein the occurrence of the predetermined event is an attempt to access a voicemail message of a voicemail server on the network.

11. The method of claim 10, wherein the request for the updated authorization token corresponds to a request received by the computing system from the mail server.

12. The method of claim 7, wherein the predetermined event occurs if the communication link between the VoIP phone and the computing device is broken.

13. The method of claim 1, wherein the user authentication data includes at least one of Lightweight Directory Access Protocol (LDAP), Active Directory (AD), and Kerberos.

14. The method of claim 1, wherein the subsequent request message containing the authorization token is associated with the user of the VoIP phone.

15. The method of claim 1, wherein the communication link is via a tethered connection.

16. The method of claim 1, wherein the communication link is a wireless connection.

17. A system for identifying a user of a Voice over Internet Protocol (VoIP) phone in a network, the system comprising:
a computing system; and
an authorization server,
wherein the VoIP phone is connected to a computing device via a communication link and includes a processor configured for:
receiving a request for an authorization token from the computing system configured to handle VoIP communications on the network;
sending a request to the computing device to generate an authorization token in response to the request received from the computing system, wherein the authorization token is generated by the computing device based on authentication data associated with the user of the VoIP phone;
receiving the authorization token from the computing device;
sending a message including the authorization token received from the computing device to the computing system for validating an identity of the user of the VoIP phone, wherein the authorization token is generated by the computing device based on token data on the authorization server;
receiving an acknowledgement from the computing system that the identity of the user of the VoIP phone has been determined, wherein the identity of the user of the VoIP phone is determined based on the authorization token and the token data on the authorization server; and
sending, in response to the acknowledgement, a subsequent message containing the authorization token received from the computing device to the computing system.

18. A non-transitory computer-readable storage medium storing instructions that, when executed by a processor, cause an identity of computer program product for identifying a user of a Voice over Internet Protocol (VoIP) phone in a network to be determined, the VoIP phone connected to a computing device via a communication link, by performing the steps of: receiving a request for an authorization token from a computing system configured to handle VoIP communications on the network; sending a request to the computing device to generate an authorization token in response to the request received from the computing system, wherein the authorization token is generated by the computing device based on authentication data associated with the user of the VoIP phone; receiving the authorization token from the computing device; sending a message including the authorization token received from the computing device to the computing system for validating an identity of the user of the VoIP phone, wherein the authorization token is generated by the computing device based on token data on an authorization server; receiving an acknowledgement from the computing system that the identity of the user of the VoIP phone has been determined, wherein the identity of the user of the VoIP phone is determined based on the authorization token and the token data on the authorization server; and sending, in response to the acknowledgement, a subsequent message containing the authorization token received from the computing device to the computing system.

* * * * *